(12) United States Patent
Alanen et al.

(10) Patent No.: US 10,965,650 B2
(45) Date of Patent: Mar. 30, 2021

(54) INDICATING CHANNEL USAGE IN WIRELESS NETWORK

(71) Applicant: NOKIA TECHNOLOGIES OY, Espoo (FI)

(72) Inventors: Olli Alanen, Vantaa (FI); Jarkko Kneckt, Espoo (FI); Janne Marin, Espoo (FI); Mika Kasslin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 572 days.

(21) Appl. No.: 15/572,120

(22) PCT Filed: May 11, 2015

(86) PCT No.: PCT/FI2015/050314
§ 371 (c)(1),
(2) Date: Nov. 6, 2017

(87) PCT Pub. No.: WO2016/181016
PCT Pub. Date: Nov. 17, 2016

(65) Prior Publication Data
US 2018/0124670 A1    May 3, 2018

(51) Int. Cl.
*H04L 29/06* (2006.01)
*H04W 74/00* (2009.01)
(Continued)

(52) U.S. Cl.
CPC ........ *H04L 63/0428* (2013.01); *H04L 63/126* (2013.01); *H04L 67/1046* (2013.01);
(Continued)

(58) Field of Classification Search
CPC ... H04W 36/165; H04W 12/02; H04W 12/06; H04W 74/002; H04W 28/18; H04L 63/0428; H04L 63/126; H04L 67/1046
(Continued)

(56) References Cited

U.S. PATENT DOCUMENTS

2005/0091501 A1* 4/2005 Osthoff ................... G06F 21/51
                                                                    713/181
2011/0103264 A1    5/2011 Wentink
(Continued)

FOREIGN PATENT DOCUMENTS

| WO | 2006119281 A2 | 11/2006 |
|---|---|---|
| WO | 2010030516 A2 | 3/2010 |
| WO | 2012033379 A2 | 3/2012 |

OTHER PUBLICATIONS

International Search Report and Written Opinion for International Application No. PCT/FI2015/050314, dated Sep. 2, 2015 (17 pages).
(Continued)

*Primary Examiner* — Chi Tang P Cheng
(74) *Attorney, Agent, or Firm* — Brake Hughes Bellermann LLP

(57) ABSTRACT

This document discloses a solution for providing channel usage information. In an embodiment, an apparatus managing a wireless network and being in an unassociated state towards an access node managing another wireless network is provided with the channel usage information. The channel usage information is provided together with a further information element enabling the apparatus to verify that the channel usage information originates from a trusted source.

20 Claims, 7 Drawing Sheets

(51) Int. Cl.
H04W 12/06 (2021.01)
H04W 12/00 (2021.01)
H04L 29/08 (2006.01)
H04W 36/16 (2009.01)
H04W 28/18 (2009.01)

(52) U.S. Cl.
CPC ......... *H04W 12/001* (2019.01); *H04W 12/06* (2013.01); *H04W 36/165* (2013.01); *H04W 74/002* (2013.01); *H04W 28/18* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2011/0310816 | A1* | 12/2011 | Kim | H04W 72/042 370/329 |
| 2012/0094681 | A1 | 4/2012 | Freda et al. | |
| 2012/0120892 | A1* | 5/2012 | Freda | H04W 8/005 370/329 |
| 2014/0082205 | A1 | 3/2014 | Abraham et al. | |

OTHER PUBLICATIONS

European Search Report for Application No. 15891728.6, dated Sep. 27, 2018, 14 pages.
Alotaibi et al., "An Empirical Fingerprint Framework to Detect Rogue Access Points", Long Island Systems, Applications and Technology, May 1, 2015, Farmingdale, New York, 7 pages.
Berezin et al., "Multichannel Virtual Access Points for Seamless Handoffs in IEEE 802.11 Wireless Networks", 73rd Vehicular Technology Conference (VTC Spring), May 15-18, 2011, Yokohama, Japan, 5 pages.
Ma et al., "A Hybrid Rogue Access Point Protection Framework for Commodity Wi-Fi Networks", Infocom 2008, The 27th Conference on Computer Communications, Apr. 13-18, 2008, Phoenix, Arizona, 9 pages.
Extended European Search Report for European Application No. 15891728.6, dated Jan. 2, 2019, 12 pages.
Office Action for European Patent Application No. 15891728.6, dated Oct. 23, 2020, 6 pages.

* cited by examiner

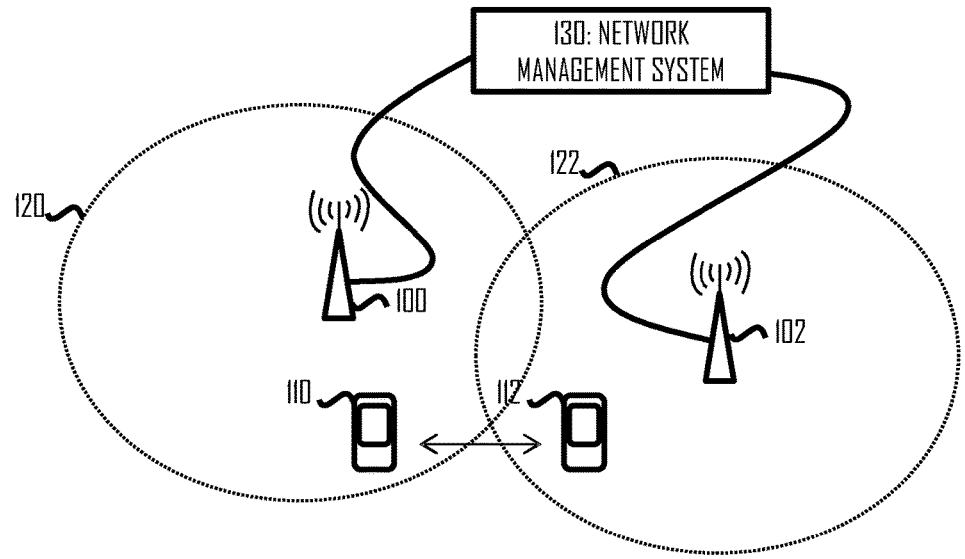
Fig 1
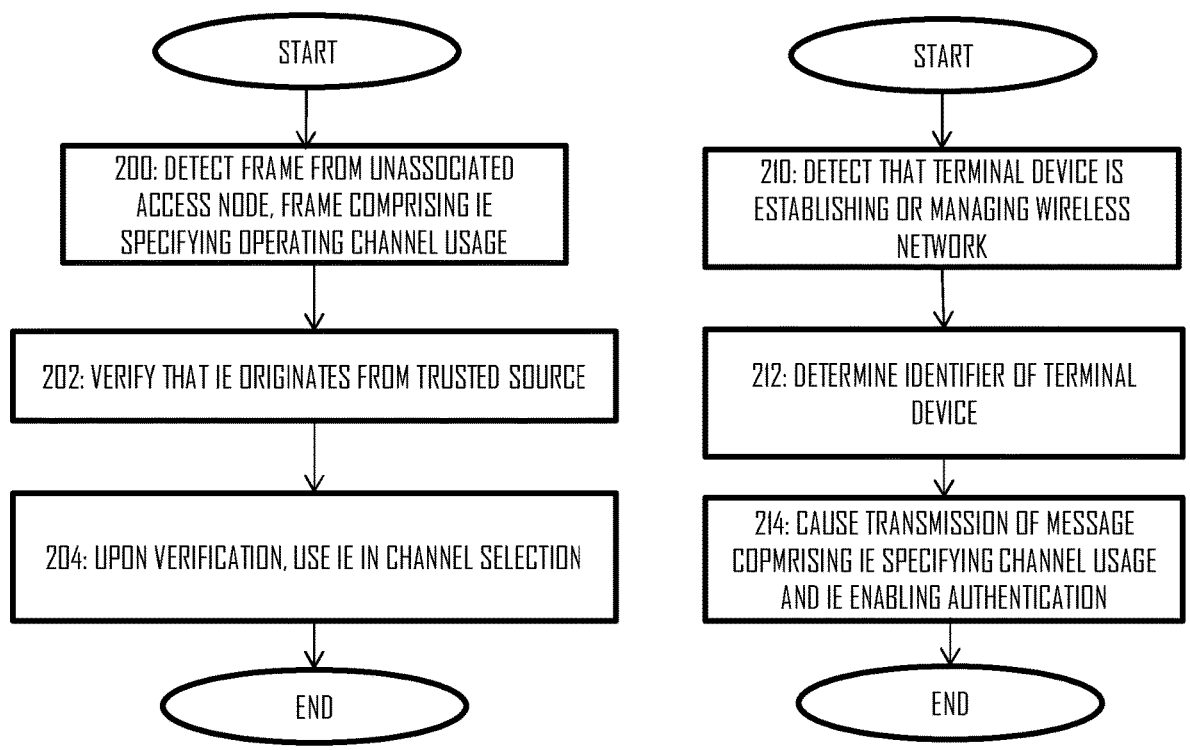
Fig 2A
Fig 2B

INDICATING CHANNEL USAGE IN WIRELESS NETWORK

CROSS-REFERENCE TO RELATED APPLICATIONS

This application is a national stage entry of PCT Application No. PCT/FI2015/050314 filed May 11, 2015, entitled "INDICATING CHANNEL USAGE IN WIRELESS NETWORK" which is hereby incorporated by reference in its entirety.

FIELD

The invention relates to the field of wireless communications and, particularly, to indicating channel usage in a wireless network.

BACKGROUND

Nowadays, multiple wireless networks may be present on a common frequency band. In particular, unlicensed frequency bands may be operated by separate wireless networks and, although the available frequency spectrum is wide, two networks may choose to operate on overlapping frequency bands. This may degrade the performance of the networks.

BRIEF DESCRIPTION

According to an aspect, there is provided the subject matter of the independent claims.
Embodiments of the invention are defined in dependent claims.

LIST OF DRAWINGS

Embodiments of the present invention are described below, by way of example only, with reference to the accompanying drawings, in which FIG. 1 illustrates an example of a wireless communication scenario to which embodiments of the invention may be applied;

FIGS. 2A to 2C illustrate flow diagram of processes for providing channel usage information of operating wireless networks according to some embodiments of the invention;

DESCRIPTION OF EMBODIMENTS

Figure 2C:
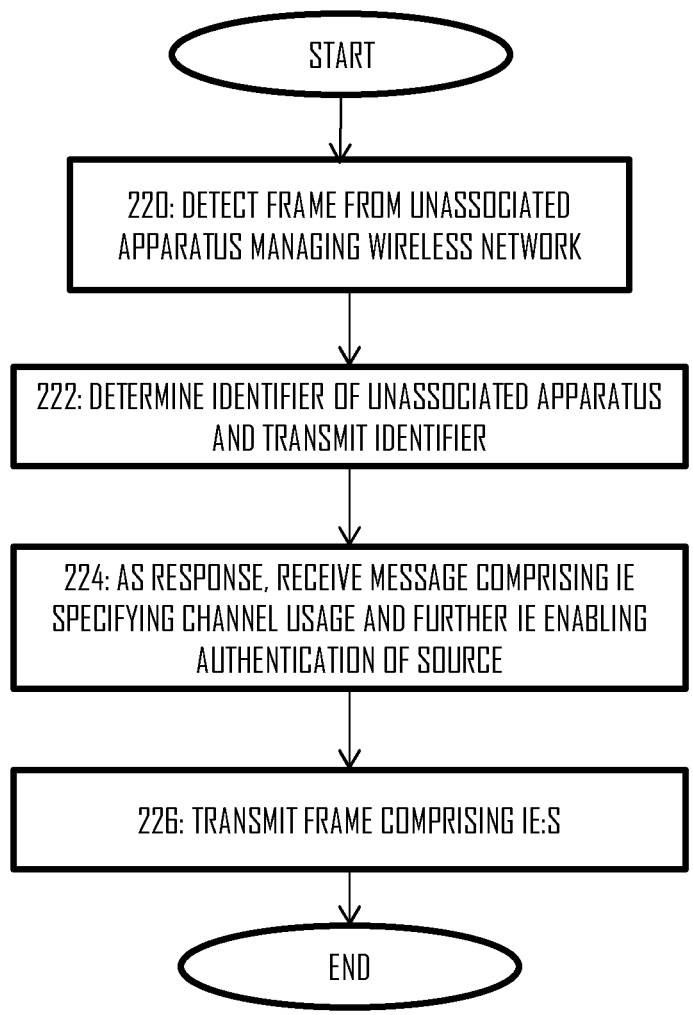

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

A general wireless communication scenario to which embodiments of the invention may be applied is illustrated in FIG. 1. FIG. 1 illustrates wireless communication devices comprising a plurality of access points (AP) 100, 102 and a plurality of wireless terminal devices (STA) 110, 112. Each base station may be associated with a basic service set (BSS) which is a basic building block of an IEEE 802.11 wireless local area network (WLAN). The most common BSS type is an infrastructure BSS that includes a single AP together with all STAs associated with the AP. The AP may be a fixed AP or it may be a mobile AP. The APs 100, 102 may also provide access to other networks, e.g. the Internet. In another embodiment, the BSS may comprise a plurality of APs to form an extended service set (ESS). In yet another embodiment, a terminal device 110 may establish and manage a peer-to-peer wireless network to which one or more other terminal devices 112 may associate. In such a case, the peer-to-peer wireless network may be established between two terminal devices and, in some embodiment, the terminal device managing the network may operate as an access node providing the other terminal device(s) with a connection to other networks, e.g. the Internet. In other embodiments, such routing functionality is not employed and the connection terminates in the terminal devices. Such a peer-to-peer network may be utilized for data sharing or gaming, for example.

Wi-Fi Direct is one way to implement local Wi-Fi device-to-device connections (or peer-to-peer/P2P connections as these are called in Wi-Fi Alliance terminology). Some of the Wi-Fi Direct devices are so-called headless devices. For example a speaker, headset or a sensor device might be such a device equipped with a Wi-Fi interface complying with IEEE 802.11 specifications, but without any user interface.

The access nodes 100, 102 may be connected to a network management system (NMS) 130 which may comprise an apparatus configured to maintain channel usage information of wireless networks of the access nodes (and optionally other access nodes) and to configure the channel usage of the wireless networks. For example, it may arrange wireless networks located close to each other to operate on different channels and, thus, avoid interference between the networks. An example scenario is that access nodes of an enterprise are all controlled by the same NMS 130. In an embodiment, the network management system 130 is comprised in one of the access nodes 100, 102. In another embodiment, the network management system is realized by an apparatus different from the access nodes 100, 102, e.g. by a server computer to which the access nodes may connect via a wired or wireless connection.

While embodiments of the invention are described in the context of the above-described topologies of IEEE 802.11 specifications, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features defined in the IEEE 802.19.1 specification.

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac amendment extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

The STA (or AP) may carry out a clear-channel assessment (CCA) procedure in order to determine whether the channel is free or busy. Upon detecting radio energy that exceeds a preset threshold on the channel, the STA may determine that the channel is busy and prevent the transmission. On the other hand, if the STA detects no radio energy exceeding the threshold on the channel during the determined time period, it may carry out the transmission. The STA may use a single threshold in the CCA procedure but, in some embodiments, a plurality of thresholds and frame detection are applied. Upon detecting a transmission on the channel, the STA may determine whether the on-going transmission is a frame header or frame payload portion. An example of the frame header is a physical layer convergence protocol (PLCP) header, while an example of the frame payload portion is a physical layer service data unit (PSDU). Then, the STA may determine a threshold for use with the detected transmission. For example, a first threshold may be applied to the frame header while a second, different threshold may be applied to the frame payload portion. The first threshold may be denoted by a carrier sensing header threshold, while the second threshold may be denoted by a carrier sensing data unit threshold. By default, the carrier sensing data unit threshold may be −62 decibels with respect to one milliwatt (dBm), while the carrier sensing header threshold may be −82 dBm. Accordingly, the STA may be more sensitive with respect to frame headers than with respect to frame payload portions. This ensures that the headers will less likely collide with other impending transmissions, while spatial reuse of the channel is encouraged for payload portions. According to another aspect, a channel may be considered busy if the STA is able to decode a PLCP header when a signal is detected with power level between −82 dBm and −62 dBm, and the channel may be considered busy if a signal with power level above −62 dBm is detected even if the STA is not able to decode the PLCP header.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting station (STA) will set the value of the duration field according to the time for which it expects to use the medium while all receiving STAs, except the intended receiver, update their NAV appropriately with the information in the duration field and count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device 110, 112 may establish a connection with any one of the access nodes it has detected to provide a wireless connection within the neighbourhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

The terminal devices 100 to 114 may discover the access nodes 100, 102 through a network discovery process. IEEE 802.11ai task group defines principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfil in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

The P2P connections may be considered to be inconvenient from the viewpoint of an infrastructure network because P2P connections are uncoordinated and may cause unexpected interference towards the infrastructure network. The infrastructure network may refer to a network comprising an access point or an access node. The operating channel of an infrastructure network may be managed by considering infrastructure BSSs having overlapping coverage areas, e.g. the overlapping BSSs may be allocated to different operating channels. For example, a P2P network may occupy transmission resources of the infrastructure network and, thus, reduce the performance of the infrastructure network. Some networks may define a mechanism to forbid the P2P connections on their operating channel(s). Instead of forbidding the P2P usage, better coordination may result in seamless coexistence of the wireless networks and improved overall spectral efficiency.

Some wireless networks may transmit channel usage information in broadcast beacon messages by an access node. However, a device not associated to the wireless network of the access node has no means to evaluate whether or not the information is reliable, e.g. originates from a trusted source. It may also happen that the device may receive multiple sets of channel usage information from different access nodes. If the information received from the multiple sources is contradictory, the device may be unable to verify which information is reliable and correct.

FIGS. 2A to 2C illustrate embodiments for providing a device operating a wireless network with the channel usage information of other wireless networks. Each flow diagram of FIGS. 2A to 2C represents a procedure at a different entity, e.g. a different apparatus. FIG. 2A illustrates a procedure in an apparatus managing one wireless network and receiving the channel usage information, FIG. 2B illustrates a procedure in an apparatus maintaining the channel usage information of a plurality of wireless networks, and FIG. 2C illustrates a procedure in an apparatus managing another wireless network and mediating the channel usage information. The apparatus performing the procedure of FIG. 2A may be a terminal device managing a peer-to-peer network, for example. The apparatus performing the procedure of FIG. 2C may be an access node or an access point of an infrastructure wireless network.

Referring to FIG. 2A, the process comprises in an apparatus: detecting (block 200) a frame from an access node with which the apparatus is in an unassociated state, the frame comprising an information element specifying operating channel of at least one wireless network and a further information element; verifying (block 202), on the basis of the further information element, that the information element originates from a source trusted by the apparatus; and upon verifying that the information element originates from the trusted source, configuring (block 204) a wireless network managed by the apparatus to operate on a channel different from the operating channel specified by the information element.

The unassociated state may be defined such that the apparatus has not performed the above-described association process with the access node. Accordingly, the apparatus may be considered as not belonging to the wireless network of the access node. In an embodiment, the unassociated state is an unassociated state according to IEEE 802.11 (Wi-Fi) specifications.

In an embodiment, the operating channel refers to the channel described above in connection with 802.11n specification. A similar channel arrangement may be used in other 802.11 specifications and/or in other specifications. In an embodiment, the operating channel is defined by a frequency or frequency band. The frequency band may have a bandwidth of 20 MHz or 40 Mhz. In an embodiment, at least one of the wireless networks operates only on one operating channel, e.g. the primary channel. In an embodiment, at least one of the wireless networks operates only on one primary channel and on one or more secondary channels. In an embodiment, the operating channel refers to the primary channel.

In an embodiment, the wireless network managed by the apparatus is a P2P network.

In an embodiment, the wireless network managed by the apparatus complies with Wi-Fi Direct specification. In another embodiment, the wireless network managed by the apparatus complies with a wireless communication protocol other than 802.11-based protocol. Such a wireless communication protocol may comply with at least one of the following: Bluetooth® or Zigbee or another IEEE 802.15-based protocol, ultra wide band (UWB), ANT protocol, or a cellular communication protocol. The cellular communication protocol may comply with 3GPP ($3^{rd}$ Generation Partnership Project) specifications. For example, the LTE system provides a licensed-assisted access (LAA) for unlicensed spectrum in which a network node of the cellular communication system operating on a licensed frequency band also manages operation of a wireless network on an unlicensed band. In such a case, the wireless network managed by the apparatus may be a P2P network established according to such a specification of the cellular communication system and, in some embodiments, the apparatus may have a control connection with the network node of the cellular communication system. The wireless network may be an ad hoc local area network or an ad hoc personal area network. In any one of the above-described embodiments, the access node may operate according to an 802.11-based specification.

Referring to FIG. 2B, the process comprises in an apparatus: detecting (block 210) that a terminal device is establishing or managing a wireless network; determining (block 212) an identifier of the terminal device; upon determining the identifier of the terminal device, causing (block 214) transmission of a message comprising an information element specifying operating channel of at least one wireless network and a further information element that enables the terminal device to authenticate that the information element originates from said apparatus.

In an embodiment, the detection is based on reception of a message from an access node in the above-described unassociated state with respect to the terminal device. The message may comprise an identifier of the terminal device.

Referring to FIG. 2C, the process comprises in a first apparatus managing a first wireless network: detecting (block 220) a first frame from a second apparatus, the second apparatus managing a second wireless network; in response to said detection, determining (block 222) an identifier of the second apparatus from the frame and causing transmission of a first message comprising said identifier to a third apparatus; receiving (block 224), as a response to said message from the third apparatus, a second message comprising an information element specifying an operating channel of at least one wireless network and a further information element that enables the second apparatus to authenticate that the information element originates from the third apparatus; and in response to said reception, causing (block 226) transmission of a second frame comprising the information element and the further information element.

In an embodiment, the first apparatus and the second apparatus are in the above-described unassociated state with respect to each other.

The above-described procedures enable improved management of the channel usage of the wireless networks and, therefore, improve the performance of the wireless networks. They also enable an apparatus managing a network to ensure that the received channel usage information is from a reliable source.

The apparatus managing a network may be understood broadly as to encompass establishment of the network and controlling operation of the network after the establishment.

In an embodiment, the further information element is unique to the apparatus originating the information element specifying the operating channel usage, e.g. the NMS 130. In an embodiment, the further information element is unique to a pair of devices. For example, the NMS 130 and the terminal device 110 may have established the further information element to verify integrity of communication between the NMS 130 and the terminal device. The NMS 130 may have established another further information element with another terminal device, e.g. the terminal device 112. In an embodiment, the further information element comprises an identifier of the NMS. In an embodiment, the further information element is allocated with a dedicated location in a field of the message or the frame and comprises a value of the dedicated field in the message or the frame. In another embodiment, the further information element is defined by a parameter according to which the information element specifying the channel usage in the message or the frame is processed. In an embodiment, such a parameter is an encryption key used to encrypt the information element specifying the channel usage. In an embodiment, the further information element comprises a combination of at least some of these embodiments. For example, the identifier of the NMS may be in an encrypted form and the encryption may be defined by an encryption key. Accordingly, the further information element comprises a value in the dedicated field and is further defined by a parameter according to which the further information element is processed. Such an embodiment provides for multiple independent processes for verifying that the channel usage information originates from a trusted source. Namely, the processes are decryption and the identification of the NMS, and the determining that the channel usage information originates from the trusted source may necessitate successful decryption and successful identification of the NMS.

Figure 3:
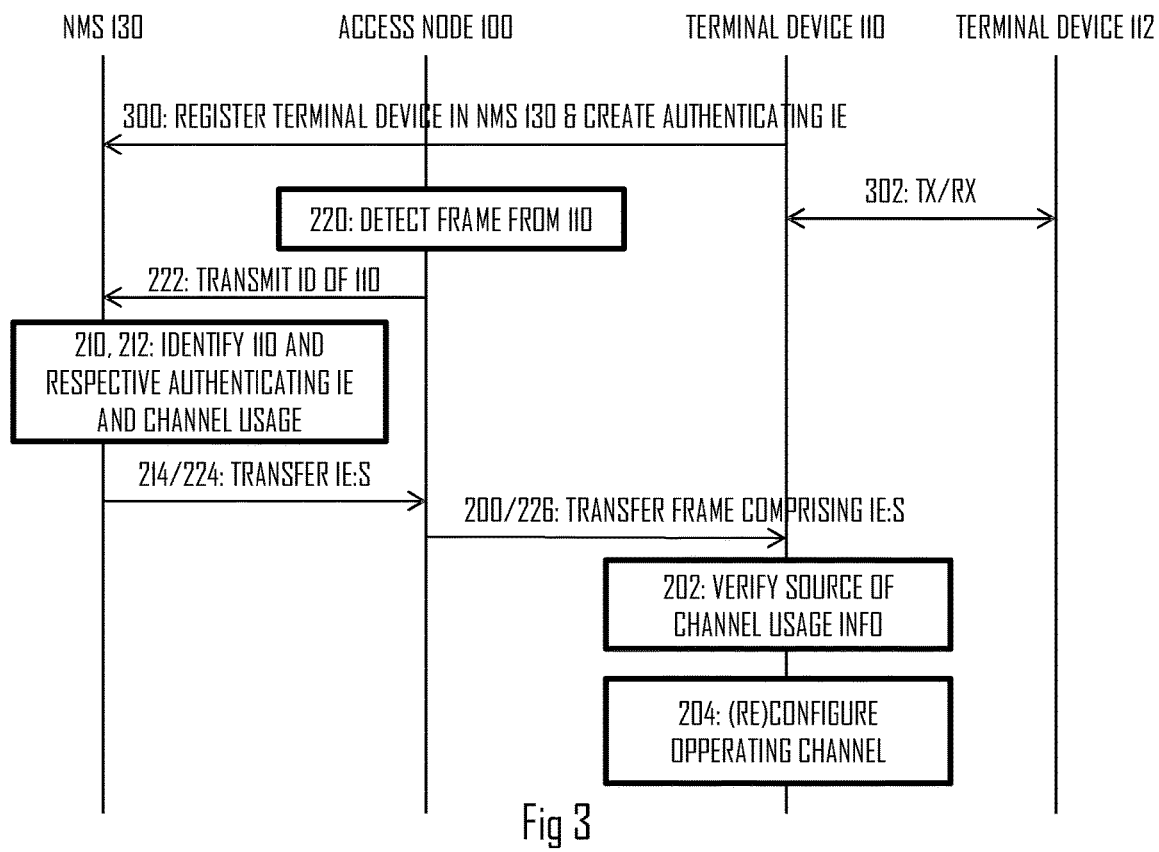
FIG. 3 illustrates a signalling diagram binding the processes of FIGS. 2A to 2C together according to an embodiment.
Figure 6:
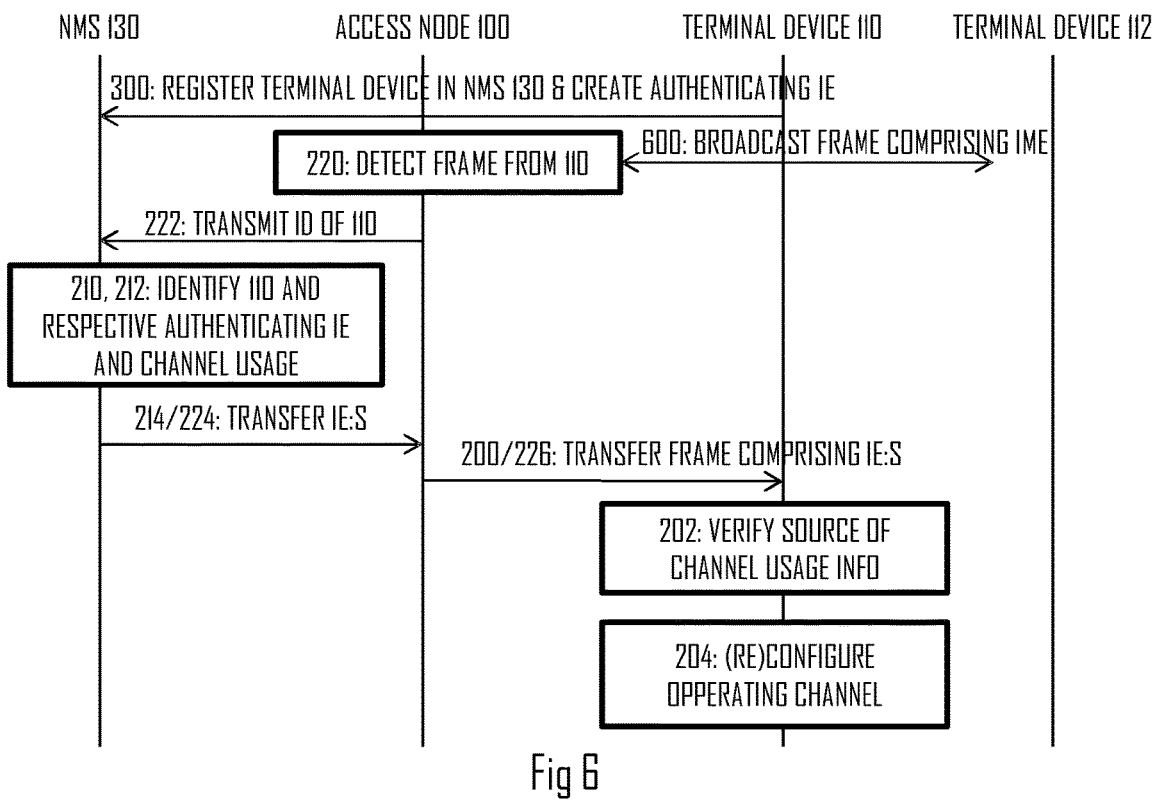
FIGS. 6 and 7 illustrate some embodiments of a signalling diagram where a terminal device managing a wireless network initiates the provision of the channel usage information.

FIGS. 3 and 6 illustrate signaling diagrams according to some embodiments describing how the processes of FIGS. 2A to 2C in individual apparatuses relate to each other. In the embodiments of FIGS. 3 and 6, the apparatus performing the process of FIG. 2A is the terminal device 110, the apparatus performing the process of FIG. 2B is the network management system (NMS), and the apparatus performing the process of FIG. 2C is the access node 100.

FIG. 3 illustrates an embodiment where the procedure for providing the terminal device 110 with the channel usage information is triggered by the access node 100 detecting a transmission by the terminal device 110. Referring to FIG. 3, the terminal device 110 may be registered to the NMS 130 in step 300, thus enabling the NMS 130 to identify the terminal device 110. The identification may be used to determine the contents of the further information element described above. In some embodiments, the registration may be omitted and the contents of the further information element may be determined by other means. For example, the identity of the NMS 130 may be established in the terminal device 110 and the further information element may comprise an identifier or another parameter unique to the NMS 130.

With respect to the step 300 for registering the terminal device 110 in the NMS 130, at least the identifier of the terminal device 110 may be transferred to the NMS 130 and stored in a memory of the NMS or in a database accessible to the NMS 130. In addition, the further information element mapped to the identifier of the terminal device 110 may be stored in association to the identifier.

In an embodiment, the identifier of the terminal device comprises a device address of the terminal device. The device address may comprise a peer-to-peer device address, e.g. a host address of a peer-to-peer connection.

In an embodiment, the identifier of the terminal device comprises an internet protocol address of the terminal device.

In an embodiment, the identifier of the terminal device comprises a medium access control address of the terminal device.

In an embodiment, the identifier of the terminal device is generated by the terminal device. For example, the terminal device may select and generate autonomously a group owner address for a wireless network it is establishing and broadcast the group owner address in beacon signals, for example. The terminal device may transmit such a group owner address to the NMS in step 300. The group owner address may be a medium access control device address, for example.

In an embodiment, the identifier of the terminal device comprises a manufacturing serial number of the terminal device, e.g. a serial number of a processor or a radio modem of the terminal device.

In an embodiment, the further information element comprises a public encryption key unique to the terminal device 110 and used to encrypt any data transmitted from the NMS 130 to the terminal device 110, e.g. the information element specifying the channel usage.

In an embodiment, the terminal device 110 may be registered to the NMS 130 by transmitting the identifier of the terminal device 110 from the terminal device 110 to the NMS 130. In other embodiments, another device may be used to register the terminal device 110 in the NMS 130. For example, let us consider the above-described headless device such as a loudspeaker. A computer such as a personal computer, a tablet computer, or a smart phone may be used to register an identifier of the headless device to the NMS 130. The registration may comprise inputting the identifier in a website associated with the NMS 130 and/or launching a registration application in the computer, wherein the registration application is defined by a computer program code configured to cause the computer to execute a computer process in which the computer receives the identifier from the headless device and, upon acquiring the identifier, transmits the identifier to the NMS 130. In addition to the identifier, another information element that may be mapped to the further information element described above, e.g. the encryption key, may be acquired from the headless device and transmitted to the NMS 130. In an embodiment, the computer may comprise a scanner configured to scan an identifier from the headless device. The scanner may be a QR (Quick Response) code reader configured to interpret QR codes from QR tags. The QR code reader may employ a camera or an imaging sensor comprised in the apparatus or connected to the apparatus. The headless device may be provided with the QR code which may be read with the QR code reader of the computer. The QR code reader may be defined by an image recognition algorithm configured to interpret the QR codes, e.g. extract the identifier of the headless device and the encryption key from the QR code attached as a label to a surface of a casing of the headless device.

The embodiment using the QR codes or other codes that may be read with a reader machine, e.g. near-field communication (NFC) codes or radio frequency identification (RFID) codes, enables a system where devices entering premises of a building, e.g. an enterprise, may be registered to an NMS managing networks in the premises. For example, the QR codes may be read from devices visitors or staff bring to the premises and, as a result of the embodiment, the devices are registered to the NMS. Then, the NMS may provide the devices with information on the channel usage of wireless networks within the premises. The premises may be defined by a geographical area such as a building or a group of buildings.

Returning to FIG. 3, let us assume that the terminal device 110 has established a wireless network with the terminal device 112 and performs frame transmissions with the terminal device 112 in step 302. The access node 100 performing channel scanning or operating its network on the channel that the terminal device 110 uses may detect the frame transmissions and, as a consequence, detect the terminal device 110 as the managing device of the wireless network (block 220). The detection may be based on detecting a beacon transmission from the terminal device 110, for example. Upon detecting the operation of the wireless network of the terminal device 110, the access node may report the identifier of the terminal device 110 to the NMS 130 (step 222).

Upon receiving the report from the access node 100, the NMS 130 may identify the terminal device 110 on the basis of the identifier comprised in the report and retrieve current channel usage information of operating wireless networks from a database storing the information, e.g. operating channels of the wireless networks managed by the access nodes 100, 102 and optionally other access nodes managed by the NMS 130. The NMS 130 may filter the retrieved channel usage information in order to reduce the channel usage information of wireless networks not relevant to the operation of the terminal device, e.g. as described below. The NMS 130 may also retrieve the further information element mapped to the identifier of the terminal device 110 and enabling the terminal device to authenticate that the channel usage information originates from the NMS. The authenticating information element may be stored in the NMS 130 in step 300 upon registering the terminal device 110 in the NMS 130.

In steps 214 and 224, the channel usage information and the authenticating information element are transferred between the NMS 130 and the access node 100, and the access node forwards the information elements to the terminal device in a frame transmission carried out in steps 200 and 226. As the terminal device 110 is not associated to the access node 100, the access node 100 may transmit the frame comprising the information elements as a broadcast transmission. Alternatively the access node 100 may transmit the information elements as a part of a frame that may be transmitted as a unicast frame in the above-described unassociated state with respect to the terminal device 110. The unicast frame may be addressed to the terminal device 110. Upon successfully receiving the frame, the terminal device 110 may transmit an acknowledgment message to the access node 100 to acknowledge the reception of the frame. Even in the case where the frame is transmitted as the broadcast frame, the terminal device 110 may acknowledge the frame reception.

In block 202, the terminal device performs authentication of the source of the channel usage information on the basis of the further information element. If the further information element maps to the authentication information element associated with the terminal device 110 in the registration in step 300, the terminal device 110 may use the channel usage information as an input when selecting or reselecting operating channel(s) for the wireless network managed by the terminal device 110. If the terminal device 110 cannot ensure that the channel usage information originates from a trusted source, it may ignore the channel usage information and potentially operate on an operating channel overlapping with an operating channel of a wireless network managed by the NMS 130.

In an embodiment, the terminal device 110 may use the received channel usage information to avoid overlapping channel use with those other wireless networks detected by the terminal device 110 or another terminal device 112 of the wireless network managed by the terminal device 110. Referring to FIG. 1, the devices 110, 112 of the wireless network managed by the terminal device 110 are in coverage areas 120, 122 of the wireless networks of the access nodes 100, 102. Therefore, upon receiving the channel usage information comprising the operating channel(s) of the wireless networks managed by the access nodes 100, 102 and, possibly, channel usage information of other wireless networks, the terminal device 100 may determine the wireless networks detected in the wireless network managed by the terminal device 110 and select an operating channel that is on a different and non-overlapping frequency channel with respect to the operating channel(s) of the detected. The terminal device 110 may disregard the operating channel(s) of those wireless networks that it has not detected.

The detection of such unmanaged wireless networks described herein may be made by any access node 100, 102 managed by the same NMS 130, and the unmanaged wireless network may be the above-described P2P network managed by a terminal device. However, the same embodiments apply to a situation where the unmanaged wireless network is managed by an access node, e.g. an infrastructure access point. An access node 100, 102 managed by the NMS 130 may report any new wireless network to the NMS 130 in order to enable coordination of the new wireless network by the NMS 130.

With respect to the retrieving the channel usage information for transmission to the terminal device 110, the NMS may consider at least some of the following parameters as an input for the selection of the channel usage information: estimated traffic load the wireless network of the terminal device 110 generates, interference of the wireless network of the terminal device 110 towards one or more wireless networks under the management of the NMS 130, capacity of a backbone link the terminal device 110 uses to connect to other networks. The backbone link may be a connection between the terminal device and an access node, e.g. the access node 102.

Figure 4:
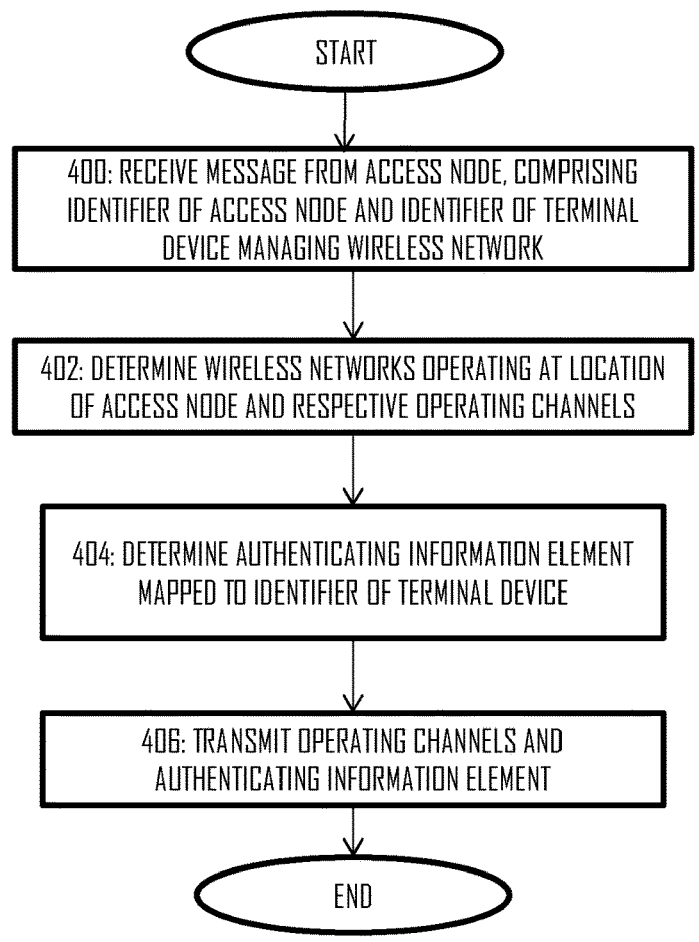
FIG. 4 illustrates an embodiment of a process for retrieving channel usage information and a further information element in a network management system.

In an embodiment, the report comprises an identifier of the access node 100. The NMS 130 may use the identifier of the access node in determining a recipient address for the message comprising channel usage information. Additionally, the NMS 130 may use the identifier in retrieving the channel usage information. In the embodiment of FIG. 4, upon receiving the report comprising the identifier of the access node 100 and the identifier of the terminal device 110 in block 400, the NMS 130 may retrieve (block 402) the channel usage information of only those wireless networks within the range of the access node 100, e.g. the wireless networks the access node 100 has indicated that it can detect. Such networks are susceptible to interference from the wireless network of the terminal device 110 while remote networks are probably not. The NMS 130 may then determine the authenticating information element mapped to the identifier of the terminal device (block 404) and transmit (block 406) the filtered list of operating channels and the authenticating information element to the terminal device 110 via the access node 100.

In an embodiment, the report comprises a channel or channels used by the wireless network of the terminal device. The NMS 130 may use this information to determine whether or not to send the channel usage information to the terminal device 110 through the access node 100. For example, if the wireless network of the terminal device is not operating on the same channel(s) as another wireless network, the NMS 130 may determine that there is no need to send the channel usage information.

In an embodiment, the report comprises a received signal strength indicator (RSSI) indicating the proximity of the terminal device 110 to the access node 100. The signal strength indicator may represent the strength of a signal transmitted by the terminal device 110 when it is received in the access node 100. The NMS 130 may use the RSSI in filtering the channel usage information to be transmitted to the terminal device. The RSSI may be used to estimate the location of the terminal device 110 and the channel usage information of wireless networks operating on or around the location may be transmitted to the terminal device 110. In another embodiment, it may be determined on the basis of the RSSI whether or not the wireless network of the access node 100 or the access node 102 suffers from the interference caused by the wireless network of the terminal device 110, if they operate on the same channel(s).

In an embodiment, the report comprises a maximum transmission power of the terminal device 110 in the wireless network managed by the terminal device. The NMS 130 may use this information in a manner similar to the RSSI described above.

Figure 5:
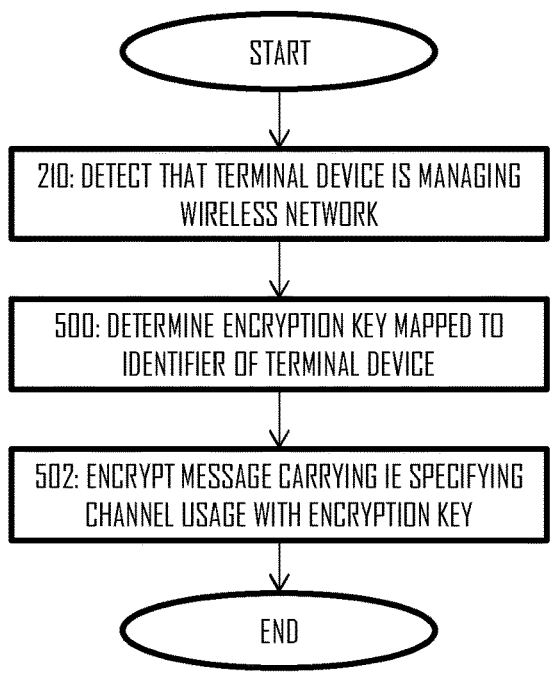
FIG. 5 illustrates an embodiment where the further information element is an encryption key used to encrypt the channel usage information.

FIG. 5 illustrates an embodiment where the authenticating information element is the encryption key mapped to the identifier of the terminal device 110. Upon detecting the terminal device 110 managing (establishing or controlling operation) the wireless network, e.g. upon reception of the report from the access node 100, the NMS 130 may determine (block 500) an encryption key mapped to the terminal device 110, e.g. during the registration in step 300. The encryption key may be a public key of the terminal device 110. Upon retrieving the encryption key and the channel usage information, the NMS 130 may encrypt (block 502) the channel usage information with the encryption key. The terminal device 110 receiving the channel usage information in the frame received from the access node 100 may use its private key to decrypt the information element carrying the channel usage information. Upon successful decryption, the terminal device 110 has authenticated that the channel usage information is from the NMS 130 (a trusted source), and the channel usage information may be used in the selection of the operating channel for the wireless network managed by the terminal device 110.

The embodiment of FIG. 3 may be based on the access node 100 detecting a frame transmission within the wireless network of the terminal device 110. In that case, the procedure for providing the channel usage information is triggered by the access node 100. Such an embodiment may cause unnecessary signalling in the sense that the access node 100 may report also those wireless networks not registered to the NMS 130. FIG. 6 illustrates an embodiment where the procedure for providing the channel usage information is triggered by the terminal device 110. In FIG. 6, the operations denoted by the same reference numbers as in FIG. 3 represent the same or substantially similar operations. Referring to FIG. 6, the terminal device 110 may transmit (step 600) a frame comprising an information element causing the access node 100 (or another access node) detecting the frame to report (step 222) the terminal device 110 to the NMS 130.

In an embodiment, the information element is defined as a P2P infrastructure-managed-element (IME) which indicates that the terminal device 110 is willing to allow the operation of its wireless network to be managed by a NMS. The element may be a one-bit indicator.

In an embodiment, the information element is comprised in a P2P Capability Attribute of Wi-Fi Direct specification, e.g. inside a one-octet long Device Capability Bitmap comprised in the P2P Capability Attribute (5 octets).

In an embodiment, the information element indicating the willingness to be managed by the NMS is comprised in a broadcast message transmitted by the terminal device.

In an embodiment, the information element indicating the willingness to be managed by the NMS is comprised in a scanning message, e.g. a beacon message, a probe request and/or probe response.

In an embodiment, the information element indicating the willingness to be managed by the NMS is comprised in an association message exchanged between the terminal devices 110, 112, e.g. an association request and/or an association response.

In an embodiment, the information element indicating the willingness to be managed by the NMS is comprised in a group owner (GO) negotiation frame exchanged between the terminal devices 110, 112 when negotiating the group owner of the wireless message.

In an embodiment, the information element indicating the willingness to be managed by the NMS is comprised in a P2P invite frame inviting a terminal device to join the P2P wireless network managed by the terminal device 110.

In an embodiment, the information element indicating the willingness to be managed by the NMS is comprised in one or more messages transmitted by the terminal device 110 during establishment of the wireless network managed by the terminal device 110, e.g. the GO negotiation frame. Such an embodiment enables the terminal device 110 to receive the channel usage information already during the establishment of the wireless network and early alignment of the channel usage with the other wireless networks. Accordingly, a complex channel change procedure during the operation of the wireless network may be avoided.

In an embodiment, the information element indicating the willingness to be managed by the NMS is comprised in a beacon message broadcast by the terminal device 110 during the operation of the wireless network. As a consequence, the mobility of the terminal device 110 and the wireless network does not cause the problem for the management of the operating channel because access nodes 100, 102 may be configured to extract the information element from the beacon messages and trigger the procedure for providing the terminal device 110 with the channel usage information.

Figure 7:
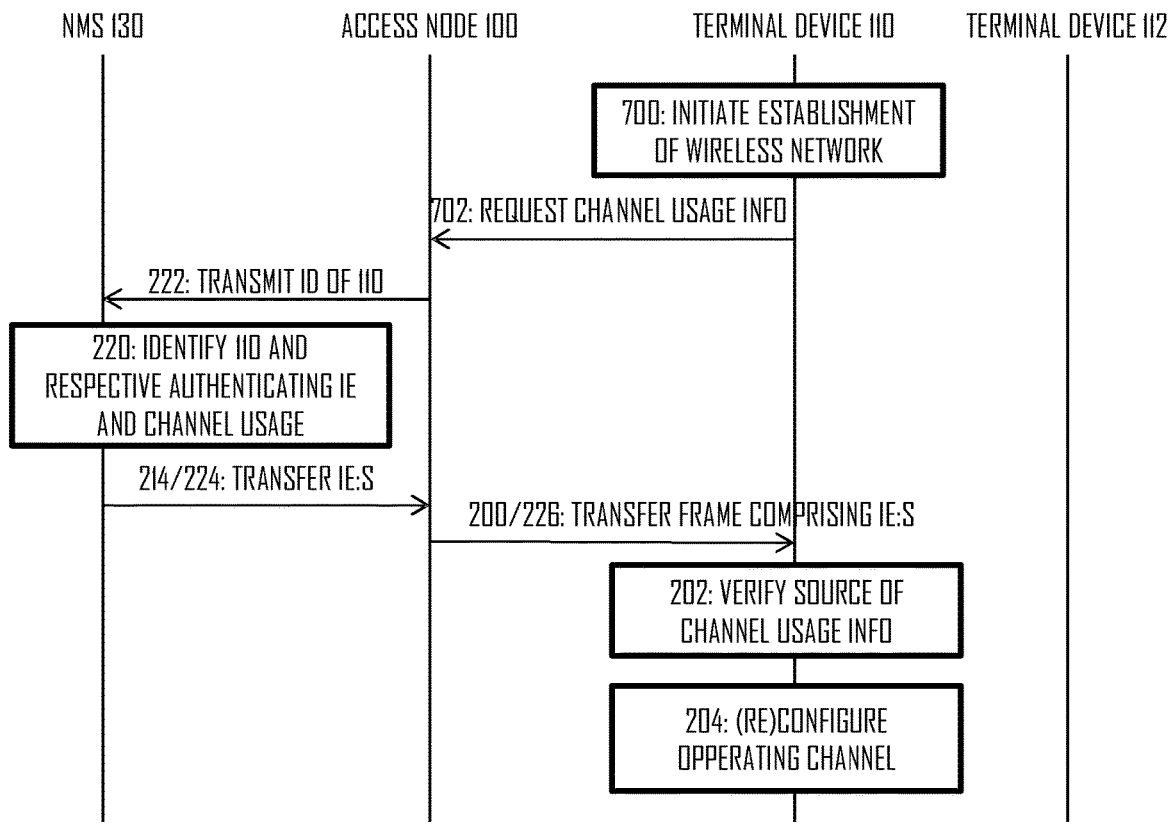

In an embodiment of the channel usage information acquisition procedure initiated by the terminal device 110, the terminal device 110 requests for the channel usage information. FIG. 7 illustrates a procedure according to such an embodiment. Referring to FIG. 7, the terminal device 110 may initiate the establishment of the wireless network in block 700. During the establishment, the terminal device 110 may generate a request message in block 702 and transmit the request message in a frame to the access node 100. Before the execution of block 702, the terminal device may have performed a scanning procedure in which it has detected the access node 100. Upon detecting multiple access nodes 100, 102, the terminal device 110 may select the target for the request according to a determined criterion, e.g. the access node associated with the strongest measured RSSI.

In an embodiment, the request message is a GAS request message comprising an information element indicating that the terminal device 110 requests for provision of the channel usage information.

In an embodiment, the request message is a request message of an access network query protocol (ANQP) which may be defined as a query and response protocol used to acquire a range of information, e.g. a domain name of an operator of a Wi-Fi hotspot and/or internet protocol address type availability (IPv4, IPv6).

Upon receiving the request form the terminal device 110, the access node 100 may carry out the reporting of the terminal device 110 and reception of the channel usage information in the above-described manner. Upon receiving the channel usage information and the further information element, the access node 100 may transmit a response frame comprising the channel usage information and the further information element. The response frame may be a response to the request of step 702.

The embodiment of FIG. 7 also allows the terminal device 110 to request for the channel usage information before completing the establishment of the wireless network.

In an embodiment, the terminal device 110 may carry out the procedure of FIG. 6 or 7 during the operation of the wireless network the terminal device 110 has established. The reason may be, for example, high error rate, low throughput, and/or long packet delay in the wireless network.

Figure 8:
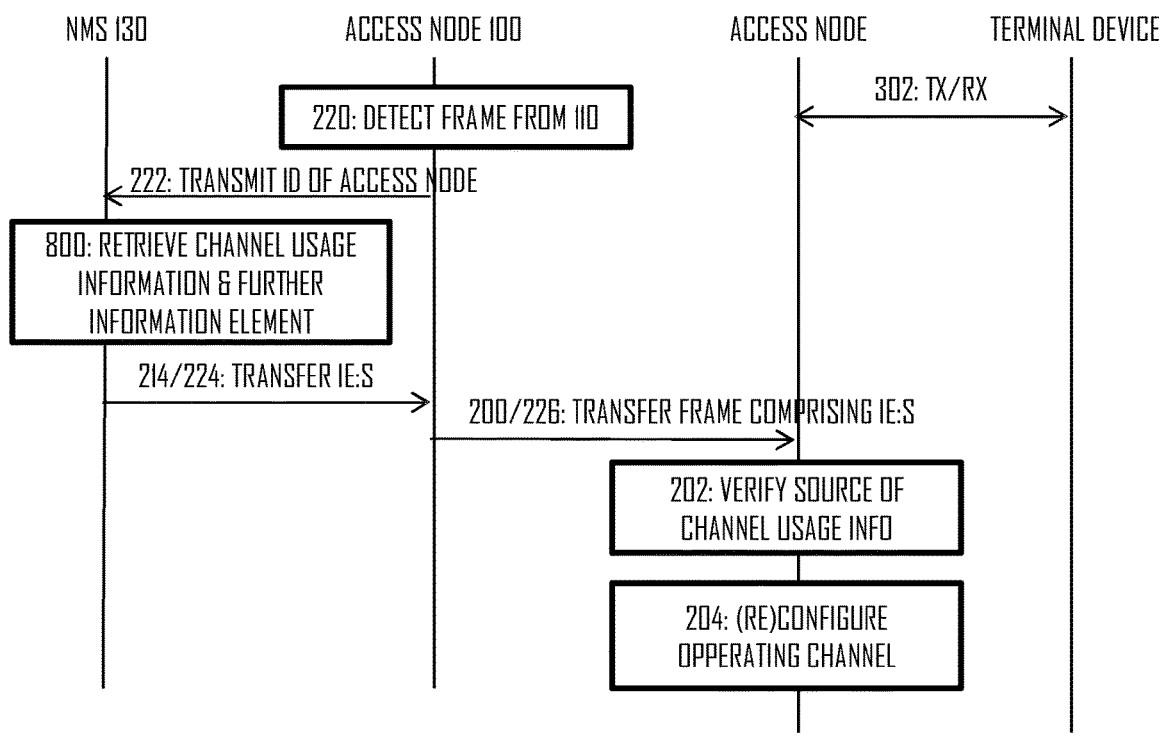
FIG. 8 illustrates an embodiment where the procedure of FIG. 3 is applied in a scenario where an access node is managing a wireless network.

As described above, the above-described embodiments are applicable to a situation where an access node not managed by any NMS is managing a wireless network. FIG. 8 illustrates an adaptation of the procedure of FIG. 3 to such a scenario. Also as described above, it is not necessary to register the managing apparatus of the wireless network to the NMS 130 beforehand. Instead, the identity of the NMS 130 may be established in the managing apparatus. Referring to FIG. 8, upon detecting a frame transmission by a new access node, the access node 100 may report the identifier of the newly detected access node to the NMS 130 (step 222). Upon receiving the report, the NMS 130 may retrieve channel usage information (block 800), e.g. according to principles described above, and the further information element enabling authentication of the NMS 130 at the new access node. As described above, the further information element may comprise an identifier of the NMS 130 or another information element identifying the NMS 130 and established beforehand in the new access node. Then, the procedure may proceed as described above, by transferring the information elements to the new access node via the access node 100 and by performing the authentication for the received channel usage information in the new access node (block 202).

Figure 9:
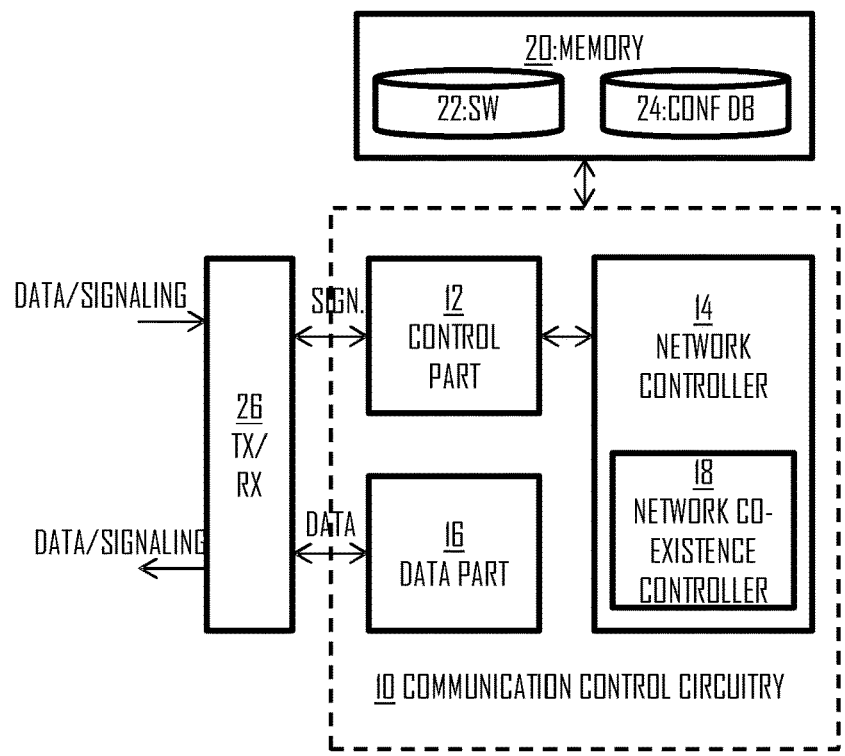
FIGS. 9 to 11 illustrate block diagrams of some embodiments of an apparatus carrying out functions related to the provision of the channel usage information.

FIG. 9 illustrates an embodiment of a structure of the above-mentioned functionalities of the apparatus executing the process of FIG. 2A or any one of the embodiments performed by the terminal device 110. The apparatus may be the terminal device 110, user equipment, a peer device, a group owner device, or a client device. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices, e.g. the terminal device 110.

Referring to FIG. 9, the apparatus may comprise a communication controller circuitry 10 configured to control wireless communications in the apparatus. The communication controller circuitry 10 may configure the establishment, operation, and termination of connections or associations in the apparatus, as described above. The communication control circuitry 10 may control management of one or more wireless networks. The communication controller circuitry 10 may comprise a control part 12 handling control signalling communication with respect to transmission, reception, and extraction of control or management frames including beacon messages, request messages, response messages, scanning or probing messages, discovery messages, request-to-send (RTS) messages, and clear-to-send (CTS) messages. The control part 12 may also carry out processing of headers of data frames. The communication controller circuitry 10 may further comprise a data part 16 that handles transmission and reception of payload data when the apparatus is associated to one or more other apparatuses.

The communication control circuitry 10 may further comprise a network controller 14 configured to control the management of the wireless network(s) managed by the apparatus. The network controller 14 may be configured to manage establishment and operation of a wireless network such as a P2P network established between another apparatus, e.g. another terminal device. The network controller 14 may comprise, as a sub-circuitry, a network co-existence controller 18 configured to maintain information on other wireless networks and select parameters for the wireless network on the basis of such information. With respect to the embodiments described above, the network co-existence controller may receive, through the control part 12, one or more frames from another apparatus with which the apparatus is in the unassociated state, wherein the one or more frames comprise the above-described channel usage information and the further information element. The network co-existence controller 18 may be configured to carry out the authentication of the source of the channel usage information on the basis of the further information element, e.g. by decrypting the channel usage information or by matching an identifier comprised in the further information element with an identifier of a trusted source stored in the apparatus. In some embodiments, the network co-existence controller 18 may be configured to initiate the acquisition of the channel usage information by causing the control part to transmit a frame indicating that the apparatus is requesting the channel usage information or taking the channel usage information into account, if any is available.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 22 configuring the apparatus to perform the above-described functionalities. The memory 20 may also store a configuration database 24 comprising communication parameters and other information needed for the wireless communications, e.g. the received channel usage parameters and/or information elements used in the authentication such as a private decryption key of the apparatus.

The apparatus may further comprise radio interface components 26 providing the apparatus with radio communication capabilities within one or more wireless networks. The radio interface components 26 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus comprises at least one processor 10 and at least one memory 20 including a computer program code 22, wherein the at least one memory and the computer program code are configured, with the at least one processor, to cause the apparatus to carry out the functionalities of the (terminal) device according to any one of the embodiments of FIGS. 2A, 3, 6, and 7. According to an aspect, when the at least one processor 10 executes the computer program code, the computer program code causes the apparatus to carry out the functionalities according to any one of the embodiments of FIGS. 2A, 3, 6, and 7. According to another embodiment, the apparatus comprises the at least one processor 10 and at least one memory 20 including a computer program code 22, wherein the at least one processor 10 and the computer program code 22 perform the at least some of the functionalities of the (terminal) device according to any one of the embodiments of FIGS. 2A, 3, 6, and 7. Accordingly, the at least one processor, the memory, and the computer program code form processing means for carrying out embodiments of the present invention in the device. According to yet another embodiment, the apparatus carrying out the embodiments of the invention in the (terminal) device comprises a circuitry including at least one processor 10 and at least one memory 20 including computer program code 22. When activated, the circuitry causes the apparatus to perform the at least some of the functionalities of the (terminal) device according to any one of the embodiments of FIGS. 2A, 3, 6, and 7.

Figure 10:
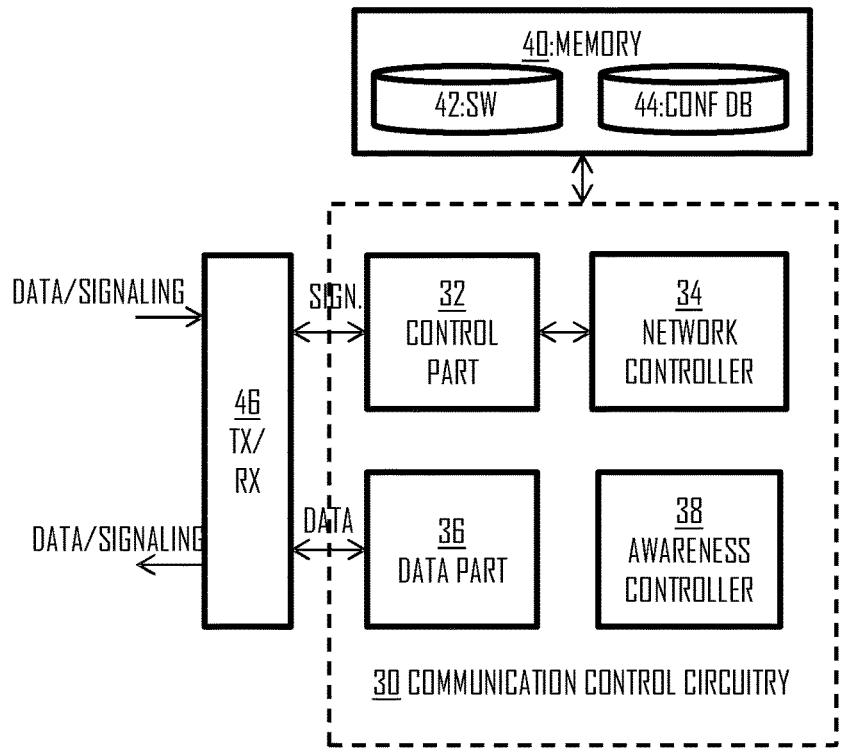

FIG. 10 illustrates an embodiment of a structure of the above-mentioned functionalities of the apparatus executing the process of FIG. 2C or any one of the embodiments performed by the access node 100. The apparatus may be the access node 100. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, infrastructure access point, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in the access node.

Referring to FIG. 10, the apparatus may comprise a communication controller circuitry 30 configured to control wireless communications in the apparatus. The communication controller circuitry 30 may configure the establishment, operation, and termination of connections or associations in the apparatus, as described above. The communication control circuitry 30 may control management of one or more wireless networks. The operation of the communication control circuitry 30 with respect to the management of the wireless network(s) may be controlled at least partly by an external apparatus, e.g. the NMS 130. The communication controller circuitry 30 may comprise a control part 32 handling control signalling communication with respect to transmission, reception, and extraction of control or management frames including beacon messages, request messages, response messages, scanning or probing messages, discovery messages, request-to-send (RTS) messages, and clear-to-send (CTS) messages. The control part 32 may also carry out processing of headers of data frames. The communication controller circuitry 30 may further comprise a data part 36 that handles transmission and reception of payload data when the apparatus is associated to one or more other apparatuses.

The communication control circuitry 30 may further comprise a network controller 34 configured to control the management of the wireless network(s) managed by the apparatus. The network controller 34 may be configured to manage establishment and operation of a wireless network, e.g. an infrastructure BSS. The network controller 34 may comprise, as a sub-circuitry, an awareness controller 38 configured to scan for the presence of other wireless networks. The awareness controller 38 may be configured to report the detected other wireless networks to the NMS 130 in the above-described manner and to mediate channel usage information and the further information element between the NMS 130 and a managing apparatus of the detected wireless network, e.g. another access node or a terminal device. In an embodiment, the network controller 34 may comprise the network co-existence controller 18. As described above, even a fixed access point may receive the channel usage information in the same manner as described above for the terminal device 110.

The circuitries 32 to 38 of the communication controller circuitry 30 may be carried out by the one or more physical circuitries or processors. In practice, the different circuitries may be realized by different computer program modules. Depending on the specifications and the design of the apparatus, the apparatus may comprise some of the circuitries 32 to 38 or all of them.

The apparatus may further comprise a memory 40 that stores computer programs (software) 42 configuring the apparatus to perform the above-described functionalities. The memory 40 may also store a configuration database 44 comprising communication parameters and other information needed for the wireless communications, e.g. an operating channel configuration received from the NMS 130.

The apparatus may further comprise radio interface components 46 providing the apparatus with radio communication capabilities within one or more wireless networks. The radio interface components 46 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus comprises at least one processor 30 and at least one memory 40 including a computer program code 42, wherein the at least one memory and the computer program code are configured, with the at least one processor, to cause the apparatus to carry out the functionalities of the access node according to any one of the embodiments of FIGS. 2C, 3, 6 to 8. According to an aspect, when the at least one processor 30 executes the computer program code, the computer program code causes the apparatus to carry out the functionalities according to any one of the embodiments of FIGS. 2C, 3, 6 to 8. According to another embodiment, the apparatus comprises the at least one processor 30 and at least one memory 40 including a computer program code 42, wherein the at least one processor 40 and the computer program code 42 perform the at least some of the functionalities of the access node according to any one of the embodiments of FIGS. 2C, 3, 6 to 8. Accordingly, the at least one processor, the memory, and the computer program code form processing means for carrying out embodiments of the present invention in the access node.

According to yet another embodiment, the apparatus carrying out the embodiments of the invention in the access node comprises a circuitry including at least one processor 30 and at least one memory 40 including computer program code 42. When activated, the circuitry causes the apparatus to perform the at least some of the functionalities of the access node according to any one of the embodiments of FIGS. 2C, 3, 6 to 8.

Figure 11:
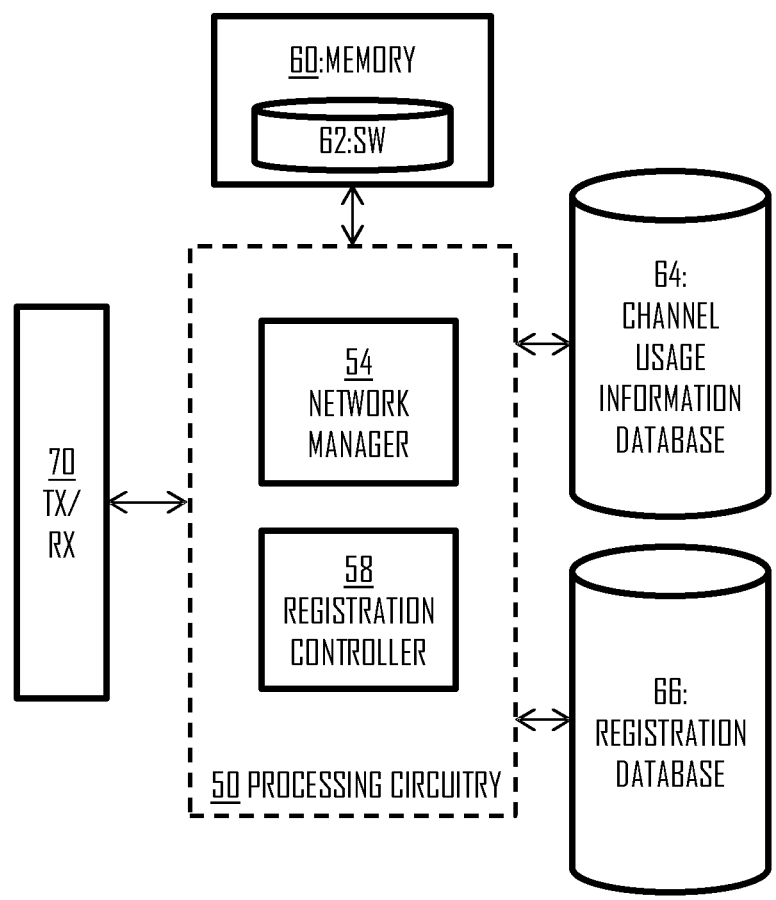

FIG. 11 illustrates an embodiment of a structure of the above-mentioned functionalities of the apparatus executing the process of FIG. 2B or any one of the embodiments performed by the NMS 130. The apparatus may be comprised in an access node or it may be provided as logically and physically separate from the access node, e.g. in a server computer. In an embodiment, the apparatus is the server computer or the access node. In another embodiment, the apparatus carrying out the above-described functionalities is comprised in such a device, e.g. the apparatus may comprise a circuitry, e.g. a chip, a chipset, a processor, a micro controller, or a combination of such circuitries in the NMS 130.

Referring to FIG. 11, the apparatus may comprise a processor 50 or a processing circuitry configured to control the operation of the apparatus. The processing circuitry 50 may comprise a network manager circuitry 54 configured to manage at least some of the parameters of one or more wireless networks, e.g. the operating channels. The network manager circuitry 54 may maintain a channel usage information database 64 stored in a memory, wherein the channel usage information database 64 may comprise information on operating channels of wireless networks managed by the apparatus and, in some embodiments, information on operating channels detected by apparatuses of the wireless networks managed by the apparatus. The information may be stored as operating channel indices which may represent the information elements specifying the operating channel of at least one wireless network. Upon receiving the above-described report about a newly detected wireless network, the network manager circuitry 54 may be configured to retrieve at least some of the operating channel indices and transmit the retrieved information elements to an apparatus managing the newly detected wireless network. One or more of the above-described filtering rules may be applied to the retrieved channel usage information.

In an embodiment, the processing circuitry 50 comprises a registration controller 58 configured to receive registration information of an apparatus and to store the registration information in a registration database 66. The registration information may be defined by the above-described further information element mapped to an identifier of the apparatus. Upon receiving the above-described report about a newly detected wireless network, the registration controller 58 may extract an identifier of the apparatus managing the newly detected wireless network, search the registration database 66 for the identifier and retrieve a further information element mapped to the identifier in the registration database. The registration controller 58 may then apply the further information element to the channel usage information element retrieved by the network manager circuitry 54 and transmit thus acquired data to the apparatus managing the newly detected wireless network.

The circuitries 54, 58 of the processing circuitry 50 may be carried out by the one or more physical circuitries or processors. In practice, the different circuitries may be realized by different computer program modules. Depending on the specifications and the design of the apparatus, the apparatus may comprise only the network manager circuitry 54 or both circuitries 54, 58.

The apparatus may further comprise a memory 60 that stores computer programs (software) 62 configuring the apparatus to perform the above-described functionalities. The memory 60 may also store the databases 64, 66, or the databases 64, 66 may be stored in another memory which may be external to the apparatus and accessed via a network connection, for example.

The apparatus may further comprise a communication interface 70 providing the apparatus with communication capabilities in a network, e.g. with one or more access nodes such as infrastructure access nodes. In an embodiment where the apparatus is comprised in an access node, the communication interface 70 may comprise an internal bus configured to carry out communications locally, e.g. with other circuitries comprised in the same casing with the processing circuitry 50. The communication interface 70 may, however, comprise hardware and software providing the processing circuitry 50 with a network connection to apparatuses in the same computer network as the apparatus and/or with apparatuses in different computer networks.

In an embodiment, the apparatus comprises at least one processor 50 and at least one memory 60 including a computer program code 62, wherein the at least one memory and the computer program code are configured, with the at least one processor, to cause the apparatus to carry out the functionalities of the NMS 130 according to any one of the embodiments of FIGS. 2B, 3 to 8. According to an aspect, when the at least one processor 50 executes the computer program code, the computer program code causes the apparatus to carry out the functionalities according to any one of the embodiments of FIGS. 2B, 3 to 8. According to another embodiment, the apparatus comprises the at least one processor 50 and at least one memory 60 including a computer program code 62, wherein the at least one processor 50 and the computer program code 62 perform the at least some of the functionalities of the NMS according to any one of the embodiments of FIGS. 2B, 3 to 8. Accordingly, the at least one processor, the memory, and the computer program code form processing means for carrying out embodiments of the present invention in the NMS. According to yet another embodiment, the apparatus carrying out the embodiments of the invention in the NMS comprises a circuitry including at least one processor 50 and at least one memory 60 including computer program code 62. When activated, the circuitry causes the apparatus to perform the at least some of the functionalities of the NMS according to any one of the embodiments of FIGS. 2B, 3 to 8.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a wireless device.

The processes or methods described in FIGS. 2A to 8 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
    detecting, by a terminal device, a frame from an access node with which the terminal device is in an unassociated state, the frame comprising an information element specifying operating channel of at least a first wireless network and a further information element, the unassociated state indicating that the terminal device not belonging to the first wireless network;
    verifying, by the terminal device on the basis of the further information element, that the information element originates from a source trusted by the terminal device; and
    upon verifying that the information element originates from the trusted source, configuring by the terminal device a second wireless network managed by the terminal device to operate on a channel different from the operating channel specified by the information element.

2. The method of claim 1, wherein the second wireless network managed by the terminal device is a peer-to-peer wireless network established between the terminal device and another terminal device.

3. The method of claim 1, wherein the further information element is defined by an encryption key used for encrypting the information element.

4. The method of claim 1, further comprising before said detection of the frame in the terminal device:
    registering the terminal device to a network management system, wherein the network management system is the trusted source, and wherein the registering comprises transmitting, by the terminal device, an identifier of the terminal device to the network management system.

5. The method of claim 1, wherein said configuring by the terminal device comprises changing the operating channel of the second wireless network to a channel different from the operating channel specified by the information element.

6. The method of claim 1, further comprising upon determining that the information element does not originate from the trusted source, maintaining a current operating channel of the second wireless network even if it overlaps with the operating channel specified by the information element.

7. A method comprising:
registering, a terminal device by a network management system, wherein the registering comprises receiving an identifier of the terminal device;
detecting, by the network management system after said registering, that the terminal device is establishing or managing a first wireless network, wherein the detection is based on receiving a message comprising the identifier of the terminal device from an access node managing a second wireless network;
upon said detecting, causing by the network management system a transmission of a message comprising an information element specifying an operating channel of at least one second wireless network and a further information element that enables the terminal device to authenticate that the information element originates from said network management system.

8. A method comprising:
detecting, by an access node managing a first wireless network, a first frame from a terminal device, the terminal device managing a second wireless network;
in response to said detection, determining by the access node an identifier of the terminal device from the frame and causing transmission of a first message comprising said identifier to a network management system;
receiving, by the access node as a response to the first message from the network management system, a second message comprising an information element specifying an operating channel of the first wireless network and a further information element that enables the access node to authenticate that the information element originates from the network management system; and
in response to said reception, causing by the access node transmission of a second frame comprising the information element and the further information element to the terminal device.

9. The method of claim 8, wherein the information element specifies an operating channel of the first wireless network.

10. The method of claim 8, further comprising detecting, on the basis of the first frame, that the terminal device manages a peer-to-peer wireless network established between the terminal device and another terminal device.

11. An apparatus comprising:
at least one processor; and
at least one memory including a computer program code, wherein the at least one memory and the computer program code are configured, with the at least one processor, to cause the apparatus to:
detect, by a terminal device, a frame from an access node with which the terminal device is in an unassociated state, the frame comprising an information element specifying operating channel of at least a first wireless network and a further information element, the unassociated state indicating that the terminal device not belonging to the first wireless network;
verify, by the terminal device on the basis of the further information element, that the information element originates from a source trusted by the terminal device; and
upon verifying that the information element originates from the trusted source, configure by the terminal device a second wireless network managed by the terminal device to operate on a channel different from the operating channel specified by the information element.

12. The apparatus of claim 11, wherein the wireless network managed by the apparatus is a peer-to-peer wireless network established between the terminal device and another terminal device.

13. The apparatus of claim 11, wherein the further information element is defined by an encryption key used for encrypting the information element.

14. The apparatus of claim 11, wherein the at least one memory and the computer program code are configured, with the at least one processor, to cause the apparatus to register, before said detection of the frame, the apparatus to a network management system, wherein the network management system is the trusted source, and wherein causing the apparatus to register comprises causing the apparatus to transmit, by the apparatus, an identifier of the apparatus to the network management system.

15. The apparatus of claim 11, wherein the at least one memory and the computer program code are configured, with the at least one processor, to cause the apparatus to perform the following in said configuring: change the operating channel of the second wireless network to a channel different from the operating channel specified by the information element.

16. The apparatus of claim 15, wherein the at least one memory and the computer program code are configured, with the at least one processor, to cause the apparatus to maintain, upon determining that the information element does not originate from the trusted source, the current operating channel of the wireless network even if it overlaps with the operating channel specified by the information element.

17. An apparatus comprising:
at least one processor; and
at least one memory including a computer program code, wherein the at least one memory and the computer program code are configured, with the at least one processor, to cause the apparatus to:
register, a terminal device by a network management system, wherein the registering comprises receiving an identifier of the terminal device;
detect, by the network management system after said registering, that the terminal device is establishing or managing a first wireless network, wherein the detection is based on receiving a message comprising the identifier of the terminal device from an access node managing a second wireless network;
upon said detecting, causing by the network management system a transmission of a message comprising an information element specifying an operating channel of at least one second wireless network and a further information element that enables the terminal device to authenticate that the information element originates from said network management system.

18. An apparatus comprising:
at least one processor; and
at least one memory including a computer program code, wherein the at least one memory and the computer program code are configured, with the at least one processor, to cause the apparatus to:
detect,
by an access node managing a first wireless network, a first frame from a terminal device, the terminal device managing a second wireless network;
in response to said detection, determine by the access node an identifier of the terminal device from the frame and causing transmission of a first message comprising said identifier to a network management system;
receive, by the access node as a response to the first message from the network management system, a second message comprising an information element specifying an operating channel of the first wireless network and a further information element that enables the second apparatus access node to authenticate that the information element originates from the network management system; and
in response to said reception, cause by the access node transmission of a second frame comprising the information element and the further information element to the terminal device.

19. The apparatus of claim 18, wherein the information element specifies an operating channel of the first wireless network.

20. The apparatus of claim 18, wherein the at least one memory and the computer program code are configured, with the at least one processor, to cause the apparatus to detect, on the basis of the first frame, that the second apparatus manages a peer-to-peer wireless network established between two terminal devices.

* * * * *